United States Patent
Tsai

(10) Patent No.: US 8,020,473 B2
(45) Date of Patent: Sep. 20, 2011

(54) HANDLE OF A HAND TOOL HAVING GRINDING CAPABILITIES

(76) Inventor: Chiung-Chang Tsai, Taichung (TW)

( * ) Notice: Subject to any disclaimer, the term of this patent is extended or adjusted under 35 U.S.C. 154(b) by 321 days.

(21) Appl. No.: 12/402,512

(22) Filed: Mar. 12, 2009

(65) Prior Publication Data

US 2009/0255380 A1 Oct. 15, 2009

(30) Foreign Application Priority Data

Apr. 11, 2008 (TW) .............................. 97113110 A

(51) Int. Cl.
*B25G 1/08* (2006.01)
*B25B 23/16* (2006.01)

(52) U.S. Cl. .............. 81/490; 7/120; 451/461; 451/540

(58) Field of Classification Search ................ 81/177.4, 81/490; 7/169, 120, 167; 30/138, 139; 451/461, 451/540, 557, 552, 542, 463
See application file for complete search history.

(56) References Cited

U.S. PATENT DOCUMENTS

| 884,030 | A | * | 4/1908 | Morton | 7/120 |
| 1,049,605 | A | * | 1/1913 | Ross | 7/120 |
| 1,208,435 | A | * | 12/1916 | Young | 7/120 |
| 1,352,888 | A | * | 9/1920 | Gallagher | 76/84 |
| 2,904,373 | A | * | 9/1959 | Dowdy et al. | 403/316 |
| 5,475,894 | A | * | 12/1995 | Wildforster | 16/430 |
| 6,571,414 | B1 | * | 6/2003 | Krenzler | 7/169 |
| 2004/0139832 | A1 | * | 7/2004 | Hu | 81/490 |

* cited by examiner

*Primary Examiner* — Debra S Meislin

(57) ABSTRACT

The present invention discloses a handle of a hand tool, which comprises a handle body and grinding members. The grinding member is mounted on the handle body, and the grinding member contains abrasive particles and has at least a grinding face, so that the user can grind the sharp edge of articles straightly by grinding member possessed by the handle. Also the user can easily replace a new grinding member when the old one is out of use. Furthermore, the abrasive particles of grinding members have average diameter being different from each other so as to grind the article to have different fine degrees.

11 Claims, 6 Drawing Sheets

HANDLE OF A HAND TOOL HAVING GRINDING CAPABILITIES

FIELD OF THE INVENTION

The present invention relates to a handle of a hand tool, especially a handle having mounted grinding members or easily replaceable grinding members, so that the user can grind the sharp edge of articles straightly by the handle and easily replace a new grinding member when the old one is out of use.

BACKGROUND OF THE INVENTION

A conventional hand tool such as U.S. Pat. No. 4,969,231, whose handle has a screw drill at one end, and outer periphery of the handle defined stripes thereon when formed by injecting plastic for increasing the friction between the handle and the hand of users. Aforementioned conventional handle with strips has the following disadvantage: The handle is easily stained with oil (such as engine oil and lubricating oil) when it works, so that the stripes will substantially decrease the friction, and the user can not drive the hand tool exactly. Also the stripes of the conventional handle has no the function of grinding sharp edge of articles or workpieces.

Another conventional hand tool such as U.S. Pat. No. 5,475,894, whose handgrip has a screw drill at one end, and a layer of friction-enhancing particles bonded to the surface of the handgrip handle body so as to prevent a slippage between the handgrip and the hand of user. The purpose and function of aforementioned conventional handgrip is prevention of slippage but not for grinding articles. Also the conventional handgrip has no a plurality of grinding surface with different average diameter of particles from each other, so that it can not grind the articles to have many kind of fines degree according to the user's wishes. Further, the layer of the conventional handgrip can not be dismounted from the handle body for easily replacing a new one after bonded.

Further, in the prior arts, there are many kinds of grinding stone or grinding wheel made of abrasive grains (such as diamond grains or CBN grains), such as U.S. Pat. Nos. 6,533,650, 4,536,195 and 6,299,522. Those conventional grinding stone or grinding wheel is used to mount on a grinding device but not on a hand tool (such as a screw driver or a wrench). The user work with a hand tool, he can not grind the articles straightly by the hand tool when he find out the edge of the articles are sharp or the articles are not easily driven, and he must inconveniently look for a grinding device to grind the sharp edge of the articles.

SUMMARY OF THE INVENTION

A first object of the present invention is to provide a handle of a hand tool having the function of grinding articles. The user can grind the articles when work and find out the edge of the articles are so sharp as to harm human handle body or find out the articles are not easily driven. For the aforementioned purpose, the handle of the present invention is designed to comprise a handle body and at least a grinding member, the outer periphery of the handle body includes at least a slot each having a first opening, and the grinding member is mounted in the slot, the grinding member contains abrasive particles and has a grinding face, the grinding face is distributed with the abrasive particles partially protruding therefrom, and the grinding face is positioned at the first opening.

A second object of the present invention is to provide a handle of a hand tool having the function of grinding articles and easily replacing a new grinding member. For the aforementioned purpose, the handle of the present invention is designed to comprise a handle body and at least a grinding member, the outer periphery of the handle body includes at least a slot each having a first opening and a second opening, the grinding member is inserted from the second opening and mounted in the slot, the handle body is connected a cover so as to close the second opening.

DETAILED DESCRIPTION OF EMBODIMENTS

Figure 1:
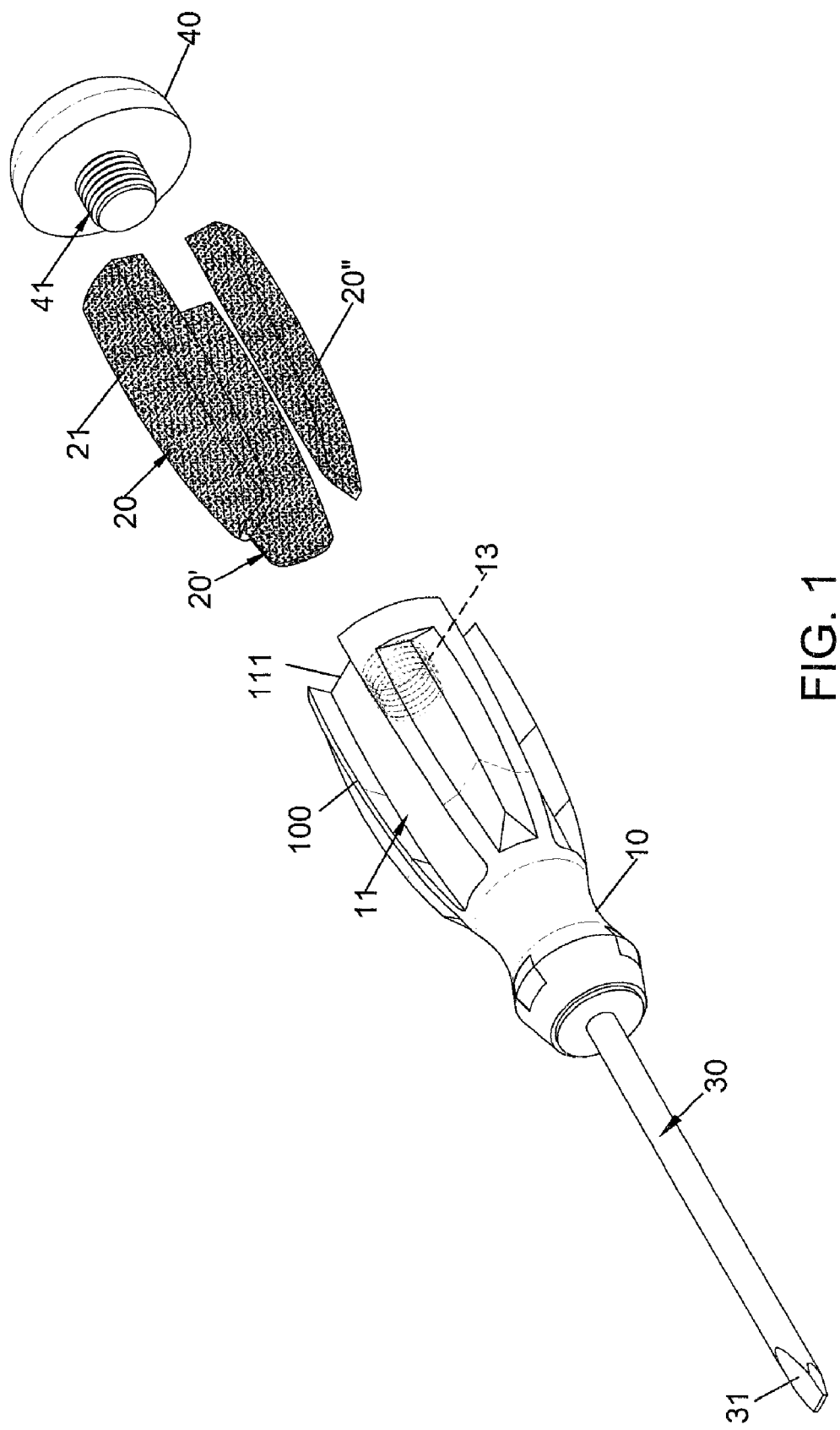
FIG. 1 is 3D exploded view of one embodiment of the present invention.
Figure 2:
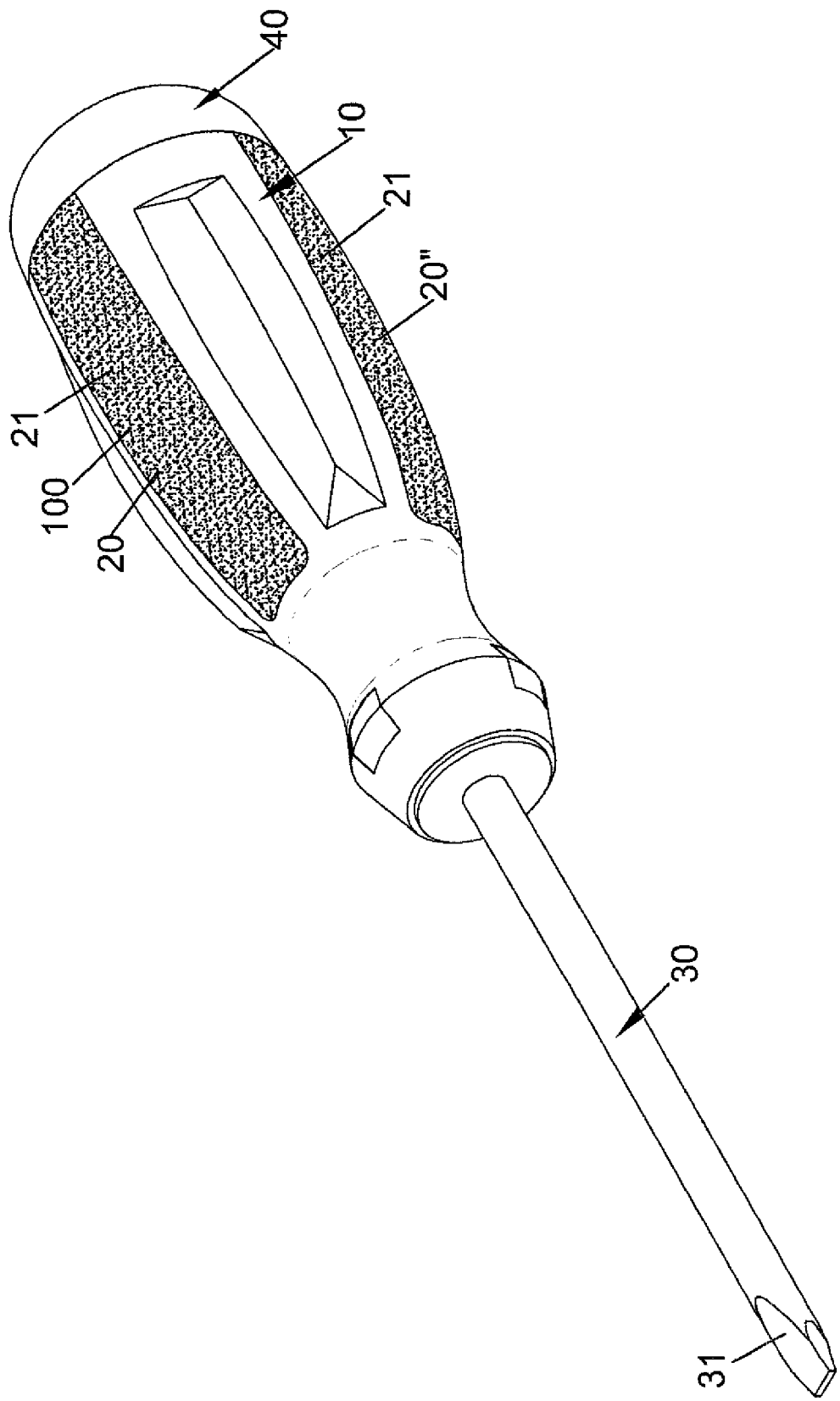
FIG. 2 is a perspective view of one embodiment of the present invention.
Figure 3:
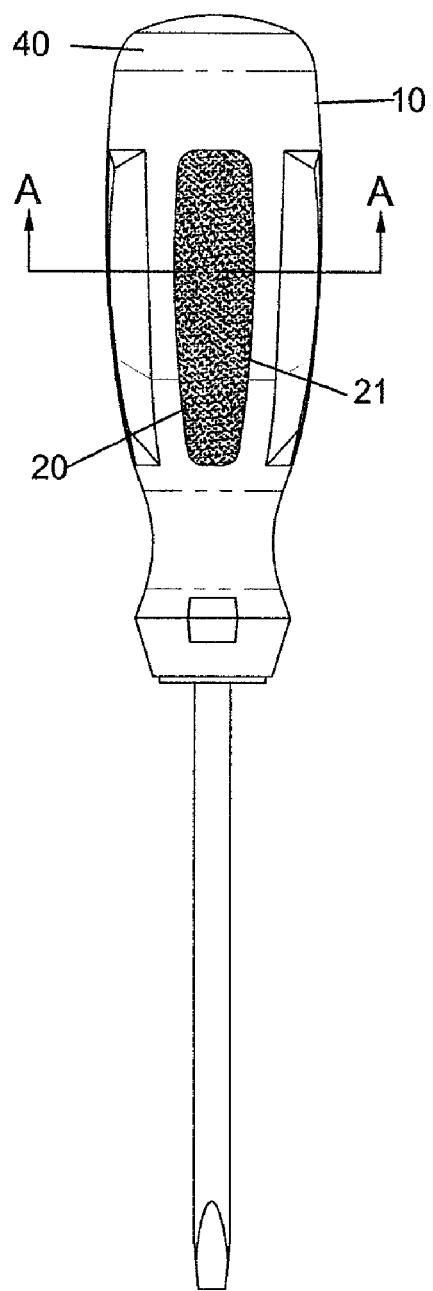
FIG. 3 is a top view of one embodiment of the present invention.
Figure 4:
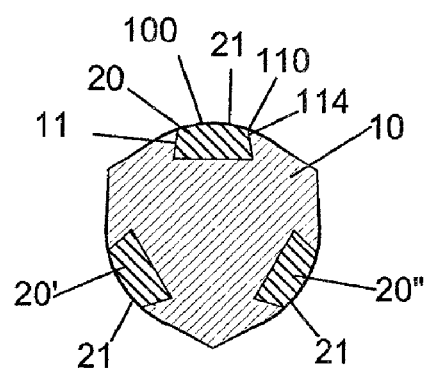
FIG. 4 is a cross-sectional view, taken along line A-A in FIG. 3.

Referring to FIG. 1-4, the handle of a hand tool the present invention comprises:

a handle body 10 provided for a user's hand holding, and the handle body 10 having opposed a front end and a rear end, the front end connecting a drive member 31 (such as a nut driver, a screw drill or a drive head of a ratchet wrench) by a connecting portion 30, an outer periphery of the handle body 10 including at least a slot 11 with a first opening 110 at the same level with the outer periphery; and at least a rigid grinding member 20/20'/20" mounted in the slot 11, the grinding member 20/20'/20" containing abrasive particles and having at least a grinding face 21, and the grinding face 21 distributed with the abrasive particles partially protruding therefrom, and the grinding face 21 positioned at the first opening 110. In an embodiment, the concentration of the abrasive particles of grinding member 20/20'/20" is at least 25% g/cm$^3$ so as to have an effective grinding capability, and a preferable concentration is at least 50% g/cm$^3$.

Referring to FIG. 1, in a preferable embodiment of the present invention, the outer periphery of the handle body 10 includes a plurality of slots 11, the number of the grinding member 20 is the same with the number of the slots 11, and the figure illustrates the number is three. The abrasive particles of one grinding member 20 has an average diameter so as to grind an object to have a fine degree, the average diameter of the abrasive particles of each grinding member 20 is different from the other. In a more preferable embodiment, the average diameter of the abrasive particles of one grinding member 20 is at least two times of the other so as to match with a popular use. In the embodiment, if the number of grinding member 20 is three, the average diameter of the abrasive particles of the second grinding member 20' is two times of the average diameter of the abrasive particles of the first grinding member 20, and the average diameter of the abrasive particles of the third grinding member 20" is four times of the average diameter of the abrasive particles of the first grinding member 20.

Referring to FIG. 1, in one embodiment of the present invention, the grinding member 20/20'/20" is formed by mixing abrasive particles and a basic material, the abrasive particles are made of carborundum or Boron Nitride (CBN), and the basic material is selected from the group which consists of clay, resin and rubber.

Referring to FIG. 1-4, in a preferable embodiment of the present invention, the width of the slot 11 gradually reduces from a bottom of the slot 11 to the first opening 110, and the grinding member 20/20'/20" is limited by a fringe 114 of the first opening 110 when the grinding member 20/20'/20" is mounted in the slot 11. wherein a first end of the slot 11 directing to the front end of the handle body 10 is closed, a second end of the slot 11 directing to the rear end of the handle body 10 includes a second opening 111, the grinding member 20/20'/20" is inserted from the second opening 111 to be mounted in the slot 11, and the rear end of the handle body 10 is connected a cover 40 to close the second opening 111. In a further embodiment, the rear end of the handle body 10 is provided a threaded hole 13 thereon, the cover includes a threaded rod 41, and the threaded rod 41 is threaded into the threaded hole 13 so that the cover is fixed on the handle body 10 and closes the second opening 111.

Figure 5:
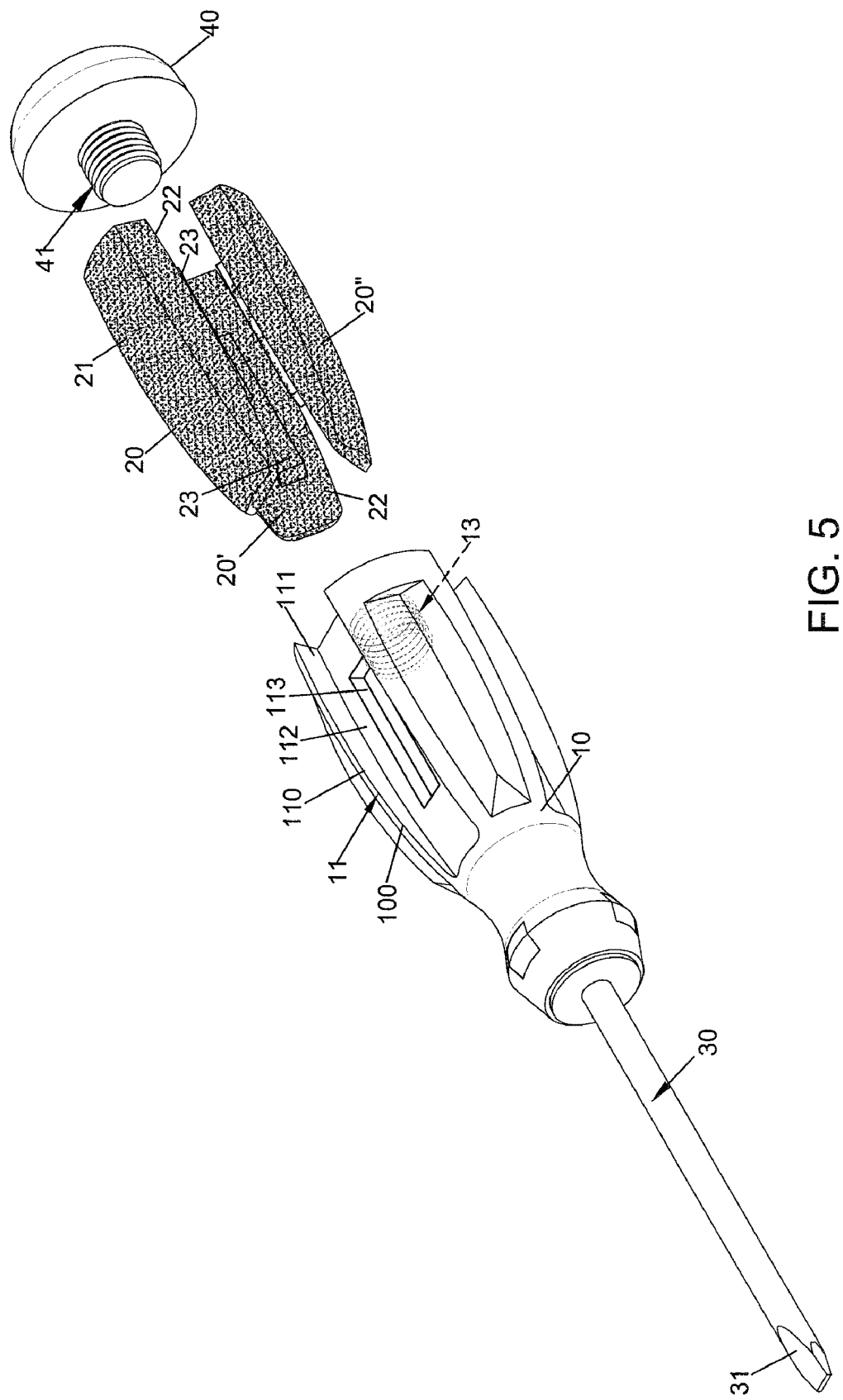
FIG. 5 is 3D exploded view of another embodiment of the present invention.
Figure 6:
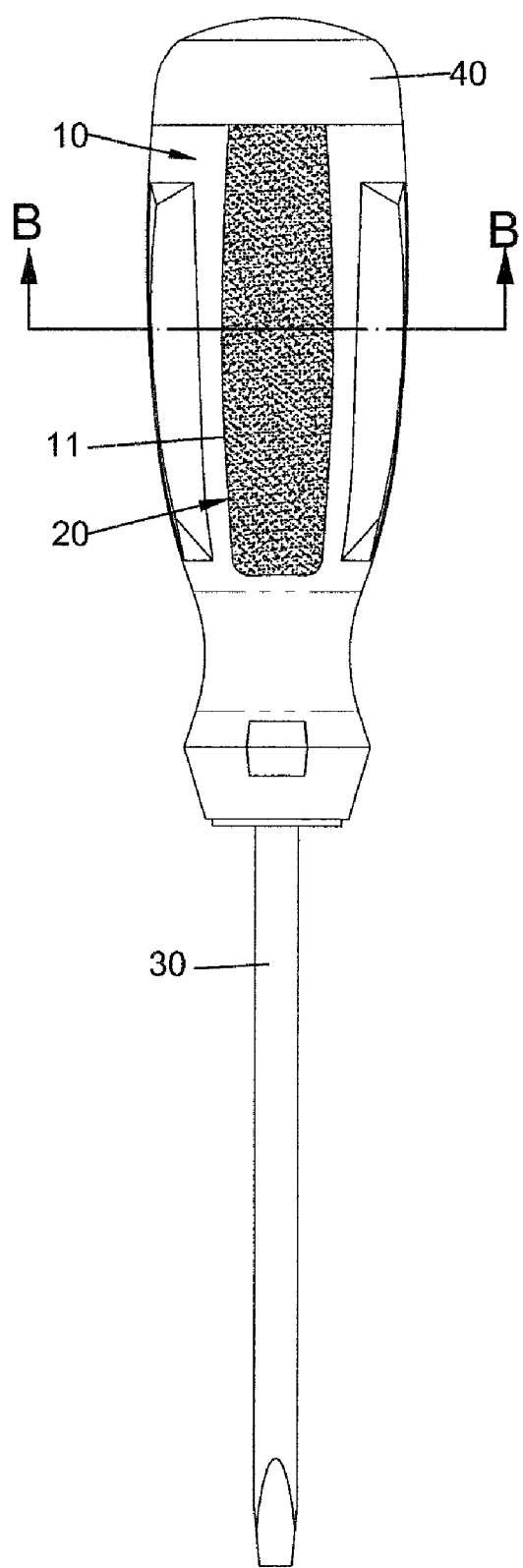
FIG. 6 is a top view of assembled another embodiment of the present invention.
Figure 7:
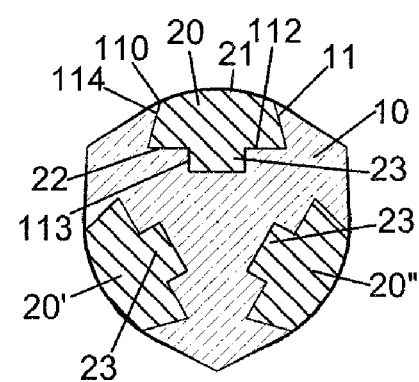
FIG. 7 is a cross-sectional view, taken along line B-B in FIG. 6.

Referring to FIG. 5-7, in a preferable embodiment of the present invention, a first surface 112 of the slot 11 opposite to the first opening 110 includes a cavity 113, a second surface 22 of the grinding member 20/20'/20" opposite to the grinding face 21 includes a protruding block 23 for mounting in the cavity 113, the grinding member 20/20'/20" can be exactly fixed on the handle body 10 so as to avoid the grinding member 20/20'/20" easily releasing from the handle body 10 when bearing a bigger longitudinal force.

Figure 8:
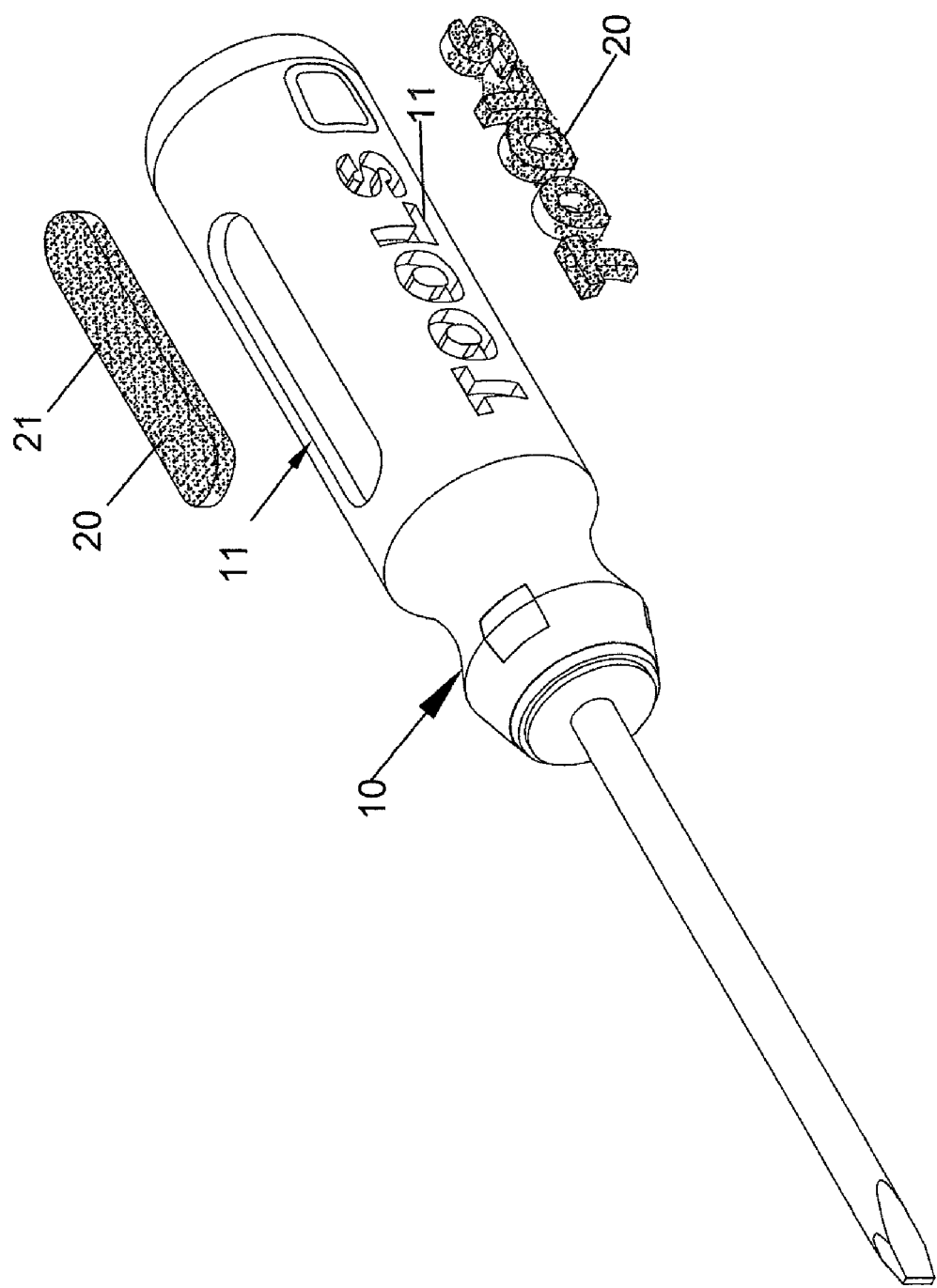
FIG. 8 is a 3D exploded view of another embodiment of the present invention.

Referring to FIG. 8, in a preferable embodiment of the present invention, the shape of grinding member 20 can be formed to be a figure or words of a brand name, also the shape of slot 11 is formed to be the same shape so as to mount with the grinding member 20.

The advantages of the present invention are as followings:

1. The first advantage of the present invention is that the user can grind the articles straightly by the handle when he works and finds out the edge of the articles are sharp as to harm human handle body or the article is not easily driven.

2. The second advantage of the present invention is that the user can easily replace a new grinding member when the old one is out of use.

3. The third advantage of the present invention is that the handle is embedded a plurality of grinding member, each grinding member has an average diameter being different the other, so that each grinding member can be used to grind the article to have different fine degree.

4. The fourth advantage of the present invention is that the handle not only has the grinding capability but also has the advertisement function when design the grinding member to be a figure or words of a brand name.

5. The fifth advantage of the present invention is that the grinding member can be exactly fixed on the handle body so as to avoid the grinding member easily releasing from the handle body when bearing a bigger longitudinal force.

While we have shown and described the embodiment in accordance with the present invention, it should be clear to those skilled in the art that further embodiments may be made without departing from the scope of the present invention.

What is claimed is:

1. A handle of a hand tool comprising:
   a handle body being provided for a user's hand holding, and the handle body having opposed a front end and a rear end, the front end connecting a drive member, an outer periphery of the handle body including at least a slot with a first opening at the same level with the outer periphery, a first surface of the slot opposite to the first opening being defined a cavity thereon; and
   at least a grinding member mounted in the slot, the grinding member containing abrasive particles and having at least a grinding face, the grinding face being distributed with the abrasive particles each partially protruding therefrom, the grinding face being positioned at the first opening, and a second surface of the grinding member opposite to the grinding face being defined a protruding block therefrom for mounting in the cavity.

2. The handle as claimed in claim 1, wherein the outer periphery of the handle body includes a plurality of slots, the number of the grinding member is the same with the number of the slots, the abrasive particles of one grinding member has an average diameter so as to grind an object to have a fine degree, the average diameter of the abrasive particles of one grinding member is different from the other.

3. The handle as claimed in claim 2, wherein the average diameter of the abrasive particles of one grinding member is at least two times of the other.

4. The handle as claimed in claim 2, wherein the number of slots and grinding members are three respectively, the average diameter of the abrasive particles of one grinding member is two times of the second grinding member, and the average diameter of the abrasive particles of third grinding member is four times of the second grinding member.

5. The handle as claimed in claim 1, wherein the grinding member is mixed and formed by mixing the abrasive particles and a basic material, the abrasive particles are made of carborundum or Boron Nitride (CBN), and the basic material is selected from clay, resin and rubber.

6. The handle as claimed in claim 1, wherein the width of the slot gradually reduces from a bottom of the slot to the first opening, the grinding member is limited by a fringe of the first opening when the grinding member is mounted in the slot.

7. The handle as claimed in claim 6, wherein a first end of the slot directing to the front end of the handle body is closed, a second end of the slot directing to the rear end of the handle body defines a second opening thereon, the grinding member is inserted from the second opening to be mounted in the slot, and the rear end of the handle body is connected a cover to close the second opening.

8. The handle as claimed in claim 7, wherein the rear end of the handle body is provided a threaded hole thereon, the cover includes a threaded rod, and the threaded rod is threaded into the threaded hole so that the cover is fixed on the handle body.

9. The handle as claimed in claim 1, wherein the grinding member is formed to be a figure or words of a brand name, and the slot is formed to be the same shape with the grinding member.

10. A handle of a hand tool comprising:
    a handle body being provided for a user's hand holding, and the handle body having opposed a front end and a rear end, the front end connecting a drive member, an outer periphery of the handle body including a plurality of slots each having a first opening at the same level with the outer periphery, a first surface of the slot opposite to the first opening being defined a cavity thereon; and
    a plurality of grinding members each being mounted in one slot respectively, each grinding member containing abrasive particles and having at least a grinding face, the grinding face being distributed with the abrasive particles each partially protruding therefrom, the grinding face being positioned at the fist opening, a second surface of grinding member opposite to the grinding face being defined a protruding block therefrom for mounting in the cavity, the abrasive particles of one grinding member having an average diameter so as to grind an object to have a fine degree, the average diameter of the abrasive particles of each grinding member being different from the other.

11. The handle as claimed in claim 10, wherein the average diameter of the abrasive particles of one grinding member is at least two times of the other.

* * * * *